US012686205B2

(12) United States Patent
Xu et al.

(10) Patent No.: US 12,686,205 B2
(45) Date of Patent: Jul. 21, 2026

(54) SUPPORT ROD AND PRINTING MACHINE

(71) Applicant: Illinois Tool Works Inc., Glenview, IL (US)

(72) Inventors: Qifeng Xu, Glenview, IL (US); Jian Zhang, Glenview, IL (US); Zhanqing Guo, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/839,942

(22) PCT Filed: Mar. 16, 2023

(86) PCT No.: PCT/US2023/015371
§ 371 (c)(1),
(2) Date: Aug. 20, 2024

(87) PCT Pub. No.: WO2023/183175
PCT Pub. Date: Sep. 28, 2023

(65) Prior Publication Data

US 2025/0170819 A1 May 29, 2025

(30) Foreign Application Priority Data

Mar. 23, 2022 (CN) ......................... 202210289884.1

(51) Int. Cl.
*B41F 35/00* (2006.01)
*B41F 15/08* (2006.01)
*B41F 15/36* (2006.01)

(52) U.S. Cl.
CPC ........ *B41F 35/003* (2013.01); *B41F 15/0813* (2013.01); *B41F 15/36* (2013.01)

(58) Field of Classification Search
CPC ..... B41F 15/0813; B41F 15/36; B41F 35/003
See application file for complete search history.

(56) References Cited

U.S. PATENT DOCUMENTS 5,991,963 A 11/1999 Tourigny
10,538,965 B1 * 1/2020 Nguyen ................ F21V 33/006
(Continued)

FOREIGN PATENT DOCUMENTS

JP H06-106834 A 4/1994
JP H10296960 A * 11/1998
JP 5899434 B2 * 4/2016

OTHER PUBLICATIONS

International Search Report for PCT Application No. PCT/US2023/015371 mailed Jul. 6, 2023.

*Primary Examiner* — Christopher E Mahoney
*Assistant Examiner* — Marissa Ferguson-Samreth
(74) *Attorney, Agent, or Firm* — Lando & Anastasi, LLP

(57) ABSTRACT

The present application provides a support rod for a cleaning paper roll of a printer, and a printer using the support rod, the support rod comprising: a first connecting part, a second connecting part and a main body part, the first connecting part being connected to a device; the second connecting part being connected to the device; the main body part being located between the first connecting part and the second connecting part in an axial direction of the support rod, and removably connected to the first connecting part and the second connecting part, so that the main body part can be connected to or separated from the device, wherein the support rod can be driven to rotate. The support rod in the present application can be conveniently removed without any need to move other components of the printer, thus facilitating replacement of the cleaning paper roll.

11 Claims, 5 Drawing Sheets

(56) References Cited

U.S. PATENT DOCUMENTS

| | | | | |
|---|---|---|---|---|
| 11,135,831 | B2 | 10/2021 | Yokoi | |
| 11,987,065 | B1 * | 5/2024 | Losiewicz | B41F 15/0881 |

* cited by examiner

SUPPORT ROD AND PRINTING MACHINE

CROSS REFERENCE TO RELATED APPLICATIONS

This application is a U.S. National Phase Application under 35 U.S.C. § 371 of International Application No. PCT/US2023/015371, filed Mar. 16, 2023, which claims priority to Chinese Priority Application No. 2022102898841 filed on Mar. 23, 2022, the entire contents of each of which is hereby incorporated by reference.

TECHNICAL FIELD

The present application relates to a support rod, in particular a support rod used for a cleaning paper roll of a solder paste printer.

BACKGROUND ART

In a printed circuit board surface sealing/affixing process, a solder paste printer is used to print solder paste onto an electronic product (such as a circuit board). A solder paste printer generally comprises mechanisms such as a stencil (also called a template), a solder paste addition apparatus, and a scraper or squeegee. During printing, a circuit board is automatically fed into the solder paste printer, and is first aligned with the stencil in the solder paste printer before the solder paste is printed onto the circuit board. Once the circuit board has been aligned with the stencil in the printer, solder paste is distributed by moving the scraper or squeegee in a skimming action over the stencil so as to force solder paste through holes in the stencil down onto the circuit board. After the printing operation, the circuit board is sent to another process step in the printed circuit board processing production line.

Once printing of one or more circuit boards has been completed, there might be a residue of solder paste on the stencil, and this residual solder paste will affect the printing of the next circuit board. For this reason, solder paste printers are often provided with cleaning paper underneath the stencil, to wipe the residual solder paste on the stencil and thus prevent the next circuit board from being affected.

SUMMARY OF THE INVENTION

According to a first aspect of the present application, a support rod for a cleaning paper roll of a solder paste printer is provided, the support rod comprising: a first connecting part, a second connecting part and a main body part, the first connecting part being connected to a device; the second connecting part being connected to the device; the main body part being located between the first connecting part and the second connecting part in an axial direction of the support rod, and removably connected to the first connecting part and the second connecting part, so that the main body part can be connected to or separated from the device, wherein the support rod can be driven to rotate.

In the support rod as described above, a first end and a second end of the main body part are provided with a first engagement part and a second engagement part respectively; one end of the first connecting part is provided with a first mating part, and one end of the second connecting part is provided with a second mating part; the first engagement part can mate with the first mating part, and the second engagement part can mate with the second mating part, to limit rotation of the main body part relative to the first connecting part or the second connecting part.

In the support rod as described above, the first engagement part is at least one recess formed in such a way as to be sunk inward from an end face of the first end of the main body part, the second engagement part is at least one recess formed in such a way as to be sunk inward from an end face of the second end of the main body part, the first mating part is at least one protrusion formed in such a way as to protrude outward from an end face of one end of the first connecting part, the second mating part is at least one protrusion formed in such a way as to protrude outward from an end face of one end of the second connecting part, and at least one protrusion of each of the first mating part and the second mating part can enter at least one corresponding recess of the first engagement part and the second engagement part of the main body part, thereby limiting rotation of the main body part relative to the first connecting part or the second connecting part.

In the support rod as described above, the first engagement part and the second engagement part each comprise multiple recesses, the multiple recesses being distributed uniformly in the circumferential direction; and the first mating part and the second mating part each comprise multiple protrusions, the multiple protrusions being distributed uniformly in the circumferential direction.

In the support rod as described above, the support rod comprises a pair of fasteners, the first connecting part and the second connecting part being connected to the main body part by means of a corresponding one of the pair of fasteners respectively, and each of the pair of fasteners being able to move in the axial direction and thereby connect the main body part to the first connecting part or the second connecting part.

In the support rod as described above, each of the first connecting part and the second connecting part comprises a guide segment, the corresponding one of the pair of fasteners being able to pass through the guide segment and enter the main body part, thereby being connected to the main body part.

In the support rod as described above, the at least one recess extends through a sidewall of the main body part in a radial direction of the support rod.

In the support rod as described above, each of the first connecting part and the second connecting part comprises a hollow segment, the hollow segment being connected to a side of the guide segment that is remote from the main body part;

the hollow segment comprises an accommodating cavity, the accommodating cavity extending through the hollow segment in a radial direction of the support rod to form at least one window on a sidewall of the hollow segment, and at least part of the corresponding one of the pair of fasteners being located in the accommodating cavity.

In the support rod as described above, the support rod is used to support a cleaning paper roll of an electronic printer.

In the support rod as described above, the length of the main body part is not less than the width of the cleaning paper roll.

According to a second aspect of the present application, a printer is further provided, the printer comprising: a first stencil support, a second stencil support and a pair of support rods, the first stencil support and second stencil support extending in a first direction and being arranged side by side, and a stencil mounting space for mounting a stencil being formed between the first stencil support and second stencil support; each of the pair of support rods extending in a second direction, the pair of support rods being located below the first stencil support and second stencil support, and each of the pair of support rods comprising: a first connecting part, a second connecting part and a main body part, the first connecting part being connected to the printer; the second connecting part being connected to the printer; the main body part being located between the first connecting part and the second connecting part in an axial direction of the support rod, and removably connected to the first connecting part and the second connecting part, so that the main body part can be connected to or separated from the printer; wherein the main body part is able to pass through the stencil mounting space and thereby be withdrawn from above the first stencil support and second stencil support, and the pair of support rods can be driven to rotate.

In the printer as described above, the main body part is located directly below the stencil mounting space, the first connecting part is at least partly located directly below the first stencil support, and the second connecting part is at least partly located directly below the second stencil support; wherein the first direction is substantially perpendicular to the second direction.

In the printer as described above, a first end and a second end of the main body part are provided with a first engagement part and a second engagement part respectively; one end of the first connecting part is provided with a first mating part, and one end of the second connecting part is provided with a second mating part; the first engagement part can mate with the first mating part, and the second engagement part can mate with the second mating part, to limit rotation of the main body part relative to the first connecting part or the second connecting part.

In the printer as described above, the first engagement part is at least one recess formed in such a way as to be sunk inward from an end face of the first end of the main body part, the second engagement part is at least one recess formed in such a way as to be sunk inward from an end face of the second end of the main body part, the first mating part is at least one protrusion formed in such a way as to protrude outward from an end face of one end of the first connecting part, the second mating part is at least one protrusion formed in such a way as to protrude outward from an end face of one end of the second connecting part, and at least one protrusion of each of the first mating part and the second mating part can enter at least one corresponding recess of the first engagement part and the second engagement part of the main body part, thereby limiting rotation of the main body part relative to the first connecting part or the second connecting part.

In the printer as described above, the first engagement part and the second engagement part each comprise multiple recesses, the multiple recesses being distributed uniformly in the circumferential direction; and the first mating part and the second mating part each comprise multiple protrusions, the multiple protrusions being distributed uniformly in the circumferential direction; wherein each of the multiple recesses extends through a sidewall of the main body part in a radial direction of the corresponding support rod.

In the printer as described above, each of the support rods comprises a pair of fasteners, the first connecting part and the second connecting part being connected to the main body part by means of a corresponding one of the pair of fasteners respectively, and each of the pair of fasteners being able to move in the axial direction and thereby connect the main body part to the first connecting part or the second connecting part; each of the first connecting part and the second connecting part comprises a guide segment, the corresponding one of the pair of fasteners being able to pass through the guide segment and enter the main body part, thereby being connected to the main body part.

In the printer as described above, each of the first connecting part and the second connecting part comprises a hollow segment, the hollow segment being connected to a side of the guide segment that is remote from the main body part; the hollow segment comprises an accommodating cavity, the accommodating cavity extending through the hollow segment in a radial direction of each of the support rods to form at least one window on a sidewall of the hollow segment, and at least part of the corresponding one of the pair of fasteners being located in the accommodating cavity.

In the printer as described above, the length of the main body part is not less than the width of the cleaning paper roll.

The support rod in the present application can be conveniently removed without any need to move other components of the solder paste printer, thus facilitating replacement of the cleaning paper roll.

DETAILED DESCRIPTION OF THE INVENTION

Figure 1A:
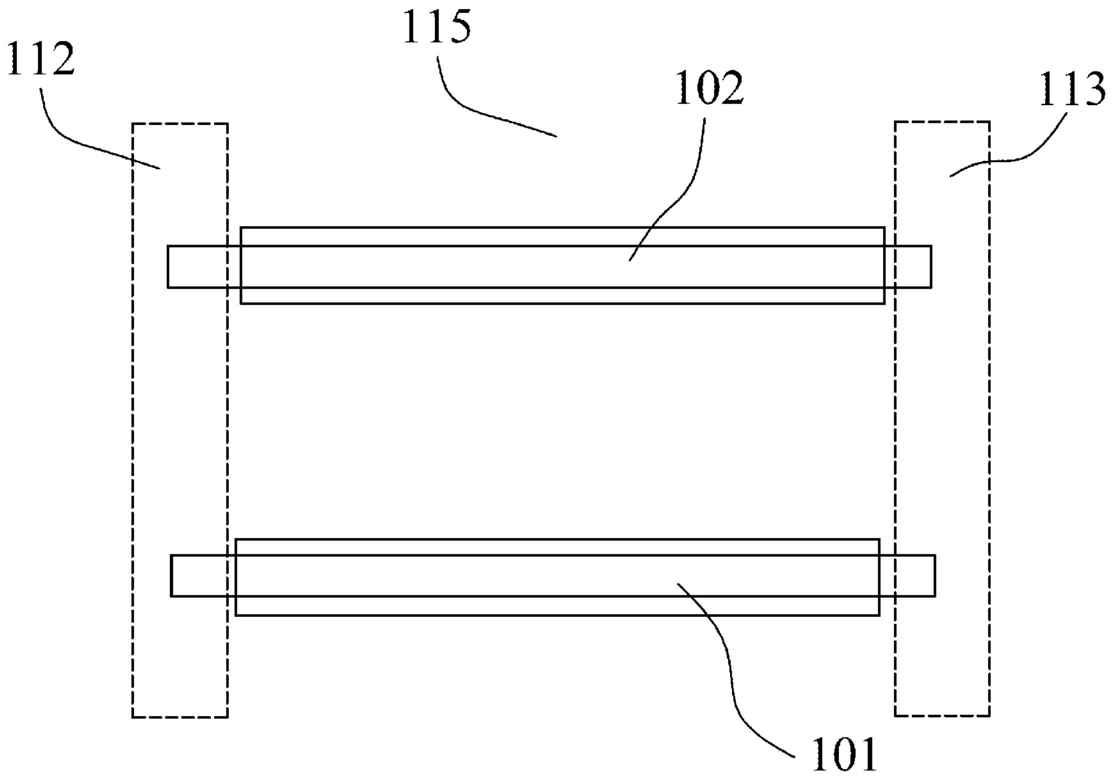
FIG. 1A is a schematic top view of a cleaning paper roll support rod of a solder paste printer in the present application and components near the installation position thereof.

Various particular embodiments of the present application are described below with reference to the accompanying drawings, which form part of this specification. It should be understood that although terms indicating direction such as "front", "rear", "up", "down", "left", "right", "top" and "bottom" are used in the present application to describe the orientation of various exemplary structural parts and elements of the present application, these terms are used here merely in order to facilitate explanation, and are determined on the basis of the exemplary orientations shown in the drawings. Since the embodiments disclosed in the present application may be arranged according to different directions, these terms indicating direction serve merely as an explanation, and should not be regarded as a restriction. Where possible, identical or similar reference labels used in the present application denote identical components.

Figure 1B:
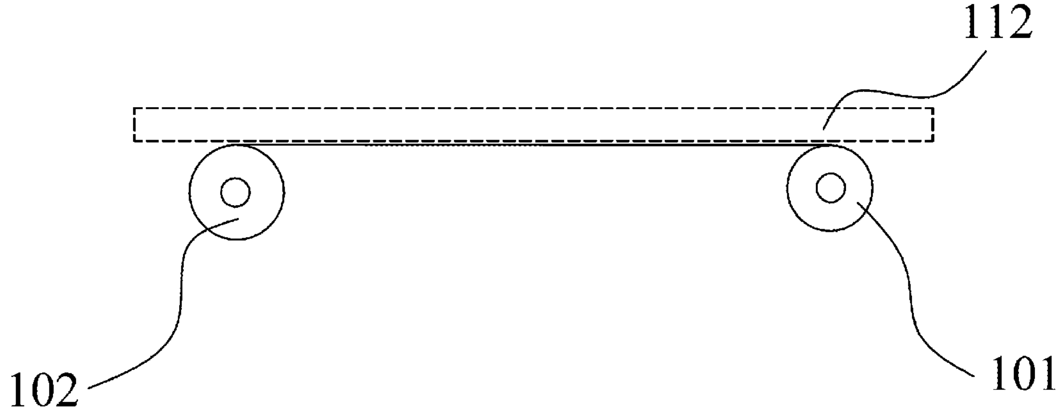
FIG. 1B is a schematic side view of the support rod in FIG. 1A and components near the installation position thereof.

FIG. 1A is a schematic top view of a cleaning paper roll support rod of a solder paste printer in the present application and components near the installation position thereof; FIG. 1B is a schematic side view of the support rod in FIG. 1A and components near the installation position thereof.

As shown in FIGS. 1A and 1B, the solder paste printer has a pair of stencil supports 112 and 113, wherein two sides of a stencil (not shown in the figures) are supported by the stencil supports 112 and 113 respectively. A pair of support rods 101 and 102 are provided below the stencil supports 112 and 113. Viewed from above the solder paste printer, both ends of each of the support rods 101 and 102 are obscured by the stencil supports 112 and 113, and middle parts of the support rods 101 and 102 are located below the region where the stencil is located.

A stencil mounting space 115 is formed between the stencil supports 112 and 113, the stencil mounting space 115 being used to mount the stencil. The stencil supports 112 and 113 extend in a first direction. The suppport rods 101 and 102 extend in a second direction (the axial direction of the support rods), wherein the first direction is substantially perpendicular to the second direction, i.e. the angle between the first direction and the second direction is 85°-95°.

The support rods 101 and 102 are connected to two ends of the cleaning paper respectively, and the cleaning paper is wound on the support rods, forming reels. The cleaning paper is wound in opposite directions on the support rod 101 and the support rod 102, and a cleaning paper working region is formed between the support rods 101 and 102, wherein the cleaning paper in the working region is able to clean the stencil. One end of each of the support rods 101 and 102 is connected to a driving means, and the support rods 101 and 102 are thus able to rotate, thereby driving the cleaning paper to rotate. During operation, used cleaning paper can be wound on support rod 101 or support rod 102 by rotating the support rods 101 and 102, such that unused cleaning paper enters the working region.

To replace the cleaning paper, the support rods 101 and 102 need to be removed from the solder paste printer. In the present application, due to mounting space limitations, the support rods 101 and 102 need to be removed from above the stencil supports 112 and 113. In the process of using the solder paste printer, it is desired that the stencil supports 112 and 113 are not removed, in order to avoid a change in stencil position due to removal of the stencil supports 112 and 113, which would affect the circuit board processing precision. Since both ends of each of the support rods 101 and 102 are blocked by the stencil supports 112 and 113, making removal in one piece difficult, the present application provides a multi-segment stencil support rod 101 and 102, to facilitate replacement of the cleaning paper.

The support rods 101 and 102 have the same structure, but are mounted in different positions; the specific structure of the support rods is described below taking support rod 101 as an example.

Figure 2A:
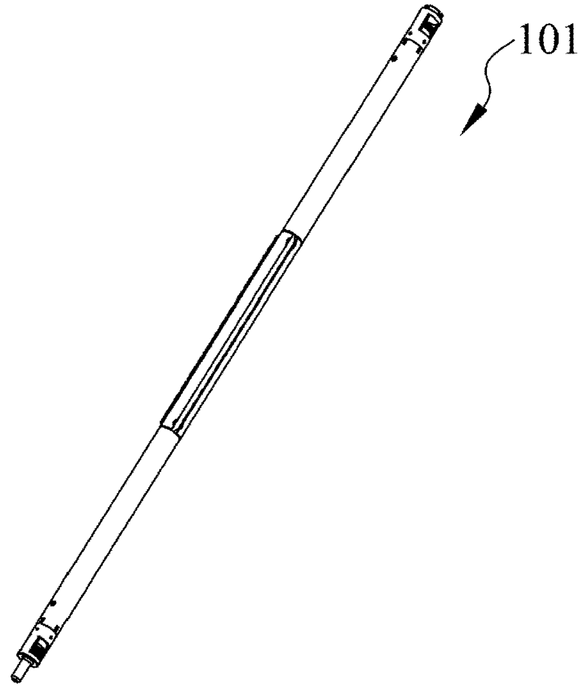
FIG. 2A is a 3D drawing of the support rod in FIG. 1A.
Figure 2B:
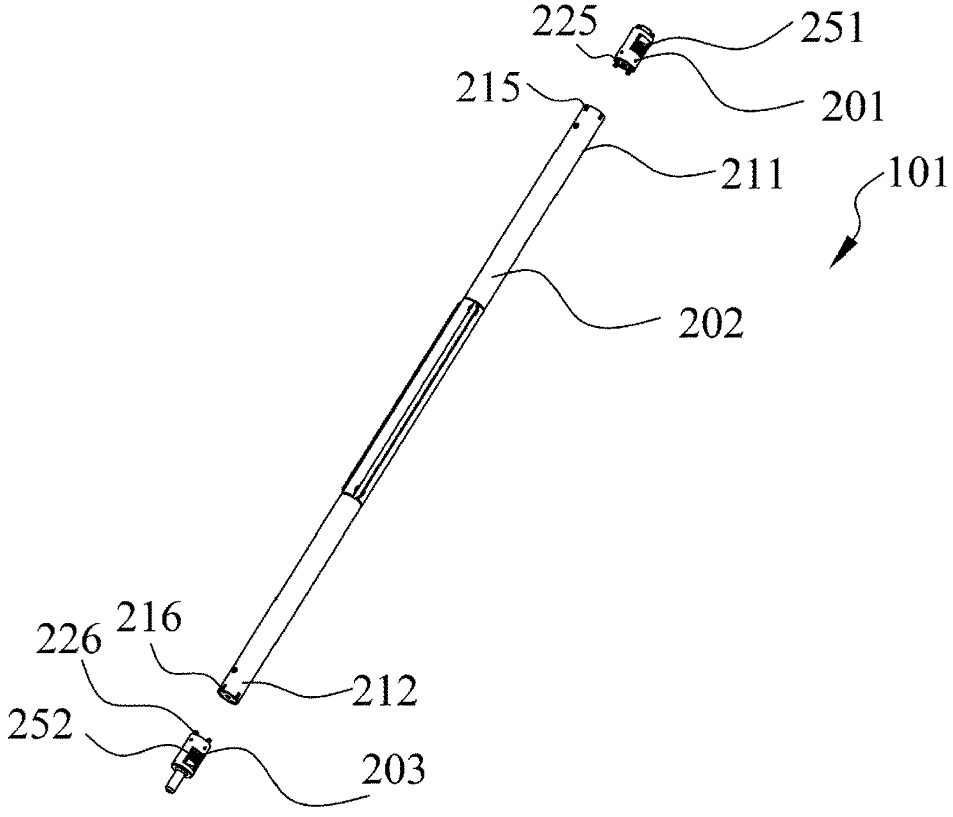
FIG. 2B is an exploded drawing of the support rod in FIG. 2A.

FIG. 2A is a 3D drawing of the support rod in FIG. 1A; FIG. 2B is an exploded drawing of the support rod in FIG. 2A. As shown in FIGS. 2A and 2B, the support rod 101 takes the form of a long rod, comprising a first connecting part 201, a main body part 202, a second connecting part 203 and a pair of fasteners 251 and 252. The first connecting part 201 and second connecting part 203 are both connected to the solder paste printer. The main body part 202 is located between the first connecting part 201 and second connecting part 203, and connected to the first connecting part 201 and second connecting part 203 by means of the fasteners 251 and 252. The main body part 202 can be removed from the first connecting part 201 and second connecting part 203. The cleaning paper is wound on the main body part 202.

The main body part 202 has a first end 211 and a second end 212; a first engagement part 215 is provided on the first end 211, and a second engagement part 216 is provided on the second end. One end of the first connecting part 201 is provided with a first mating part 225, and one end of the second connecting part 203 is provided with a second mating part 226; the first engagement part 215 can mate with the first mating part 225, and the second engagement part 216 can mate with the second mating part 226, to limit rotation of the main body part 202 relative to the first connecting part 201 or the second connecting part 203. When the support rod 101 is driven to rotate by the driving means, the first connecting part 201, the main body part 202 and the second connecting part 203 rotate together. The first connecting part 201, the main body part 202 and the second connecting part 203 are dismantably connected by means of fasteners.

Figure 3:
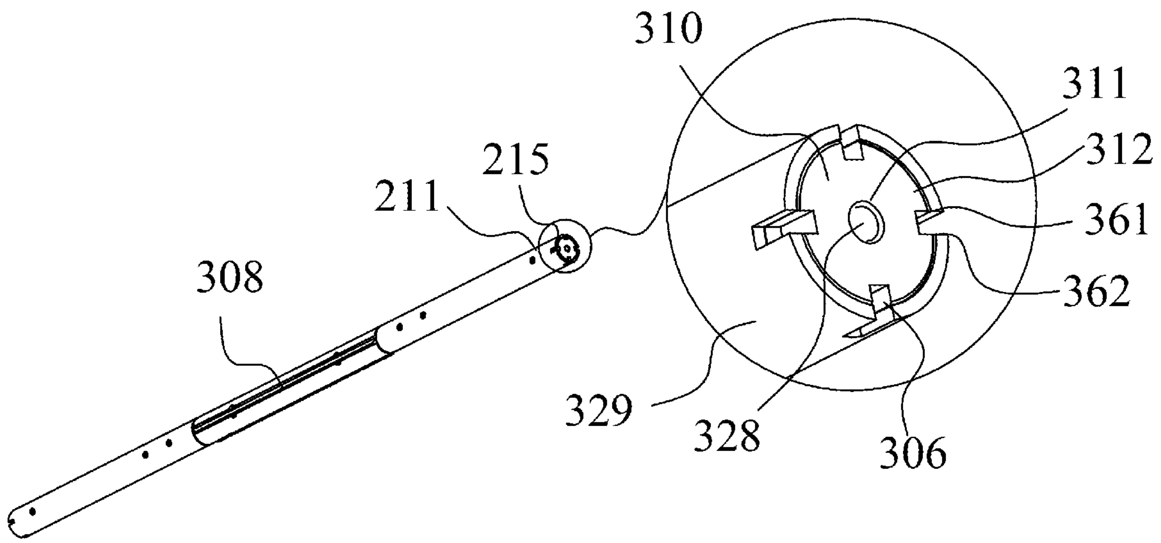
FIG. 3 is a 3D drawing of the main body part in the FIG. 2B.

FIG. 3 is a 3D drawing of the main body part 202 in the FIG. 2B; as shown in FIG. 3, a middle part between the first end 211 and the second end 212 of the main body part 202 is provided with a gripping part 308. Several sawtooth-like ribs are provided on the gripping part 308, to grip the cleaning paper and thus prevent the cleaning paper from sliding relative to the main body part 202. The first engagement part 215 and the second engagement part 216 have the same structure, and are arranged symmetrically; their structure is described below taking the first engagement part 215 as an example.

As shown in FIG. 3, the first end 211 has an end face 310, the end face 310 comprising a round central region 311 and an annular peripheral region 312 disposed around the central region 311. The main body part 202 has a threaded hole 328, formed in such a way as to be sunk inward from the central region 311 of the end face 310 in the axial direction, the threaded hole 328 being configured to mate with a fastener. The center of the threaded hole 328 coincides with a central axis of the support rod 101. The main body part 202 further comprises four recesses 306, formed in such a way as to be sunk inward from the peripheral region 312 of the end face 310. The four recesses 306 are distributed uniformly in the circumferential direction. Each of the four recesses 306 extends through a sidewall 329 of the main body part 202 in a radial direction of the support rod; hence, the recess 306 has openings in both the sidewall 329 and the end face 310. In one embodiment of the present application, a sidewall 361 and a sidewall 362 are substantially parallel to each other; that is to say, the recess 306 has a uniform width in the radial direction. There is a gap between the recess 306 and the threaded hole 328 in the radial direction; that is to say, the recess 306 and the threaded hole 328 are spaced apart. The first engagement part 215 comprises four recesses 306.

In another embodiment of the present application, the recesses 306 no longer run through the sidewall 329; thus, openings are only provided in the end face 310. In another embodiment of the present application, the number of recesses 306 is another number.

Each recess 306 is sunk inward by a certain distance in the radial direction, the depth by which it is sunk being no less than ⅛ of the diameter of the end face of the main body part. Each recess 306 has a pair of sidewalls 361 and 362 arranged opposite each other; when the support rod rotates, a protrusion of the first connecting part abuts the sidewall 361 or the sidewall 362, thereby driving the main body part to rotate.

Figure 4A:
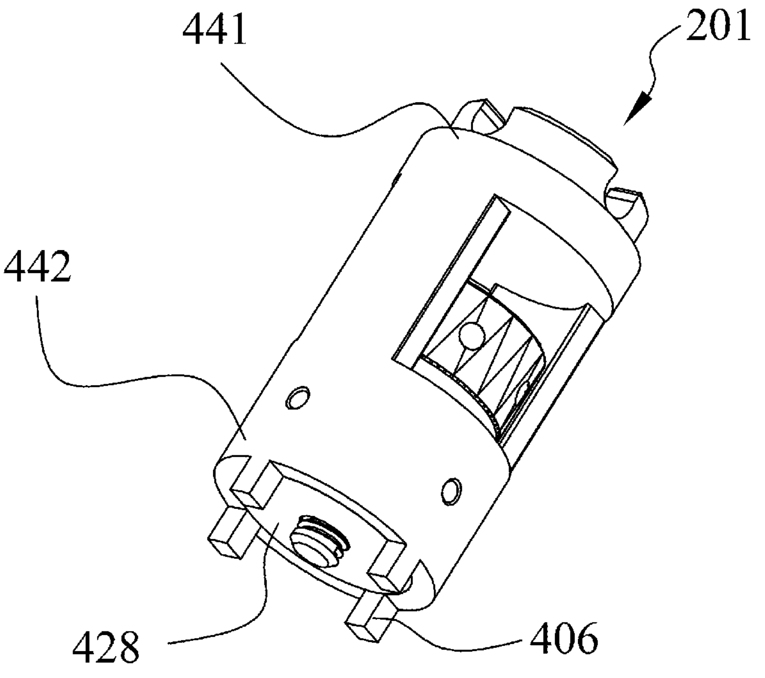
FIG. 4A is a 3D drawing of the first connecting part provided with a fastener in the present application.
Figure 4B:
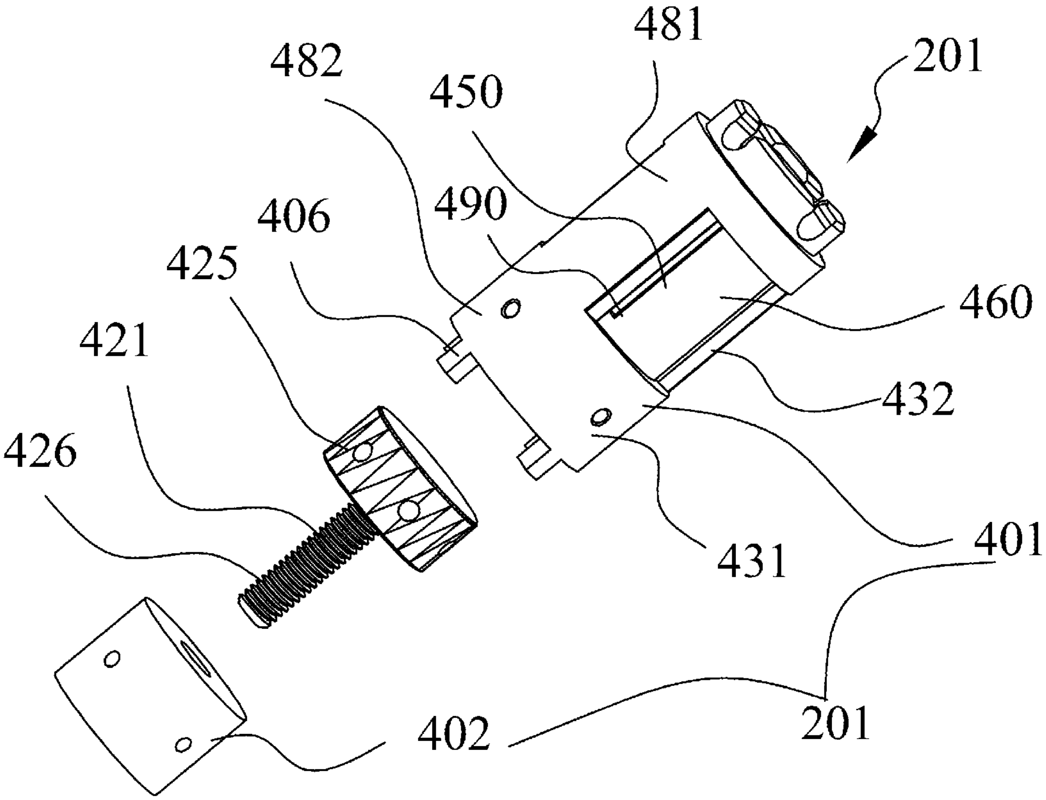
FIG. 4B is an exploded drawing of the first connecting part and the fastener in FIG. 4A.

FIG. 4A is a 3D drawing of the first connecting part provided with a fastener in the present application, and FIG. 4B is an exploded drawing of the first connecting part and the fastener in FIG. 4A; as shown in FIGS. 4A and 4B, the fastener 421 is located in the first connecting part 201. The first connecting part 201 comprises a housing 401 and a fastener mounting block 402, wherein the housing 401 and the fastener mounting block 402 are configured as removable components, to facilitate mounting of the fastener 421.

The first connecting part 201 has a first end 441 and a second end 442; the first end 441 is configured to be connected to a solder paste printer device, and the second end 442 is configured to be connected to the main body part 202 of the support rod. The second end 442 has four protrusions 406 formed in such a way as to protrude outward from an end face 428 in the axial direction, the four protrusions 406 being distributed uniformly in the circumferential direction. The four protrusions 406 are close to an outer side of the first connecting part 201; the four protrusions 406 are matched in shape to the four recesses 306 of the main body part 202, and are insertable in the four recesses 306. The four protrusions 406 form the second mating part 226.

In another embodiment of the present application, a recess is disposed on the main body part 202, and a protrusion is disposed on the first connecting part 201, and mating between the main body part 202 and the first connecting part 201 is likewise possible.

The housing 401 has a housing cavity 490, formed in such a way as to be sunk inward from the end of the housing 401 that is close to the main body part. The housing comprises a front segment 481 and a rear segment 482.

The first connecting part 201 comprises a guide segment 431 and a hollow segment 432; the guide segment 431 is close to the second end 442, and the hollow segment is close to the first end 441. The guide segment 431 is formed of the housing front segment 481 and the fastener mounting block 402 disposed therein; the fastener mounting block 402 is connected to the housing 401, and fills a space in the front segment 481, such that the guide segment 431 forms a solid body. The fastener mounting block 402 is provided with a threaded hole which runs through the fastener mounting block 402 in the axial direction, to allow the fastener to pass through.

The hollow segment 432 has an accommodating cavity 450; the accommodating cavity 450 extends through a sidewall of the hollow segment 432 in a radial direction, thereby forming a window 460. The window 460 allows an operator to operate the fastener 431 conveniently.

The fastener 421 comprises a head part 425 and a body part 426. The head part 425 has a larger diameter; the body part 426 is connected to the head part 425 and has a smaller diameter. A thread is provided on the outside of the head part 426, being able to mate with the threaded hole of the main body part and the threaded hole of the fastener mounting block 402. The body part 426 has a greater length than the fastener mounting block 402 in the axial direction, so the fastener 421 can pass through the fastener mounting block 402 and enter the main body part 202. The fastener 421 is disposed in the first connecting part 201; the head part thereof is located in the hollow segment, and the body part thereof passes through the guide segment 431. The operator can manipulate the head part 425 through the window 460, so that the fastener 421 moves axially relative to the first connecting part 201. The head part can enter the threaded hole of the main body part 202, thereby connecting the first connecting part 201 to the main body part 202.

In the present application, to facilitate mounting of the fastener 421, the first connecting part 201 is provided with the removable fastener mounting block 402; the fastener 421 is first fitted into the fastener mounting block 402, then the fastener mounting block 402 and the fastener 421 are fitted into the housing 401 together. The fastener mounting block 402 can be fixedly connected to the housing 401 by welding or screw connection, etc.

In the present application, the guide segment 431 has a certain length to ensure that the fastener 421 moves in the axial direction in the process of rotating and will not tilt easily; as a result, the first connecting part 201 and the main body part 202 are easy to fit together and separate. In one embodiment of the present application, the length of the guide segment 431 is not less than 30 mm.

In the present application, the mating of the protrusions with the recesses prevents relative rotation between the main body part 202 and the first connecting part 201. During rotation of the support rod, the first connecting part 201 relies chiefly on the mating between the protrusions and the recesses to drive the main body part 202, rather than relying on a screw or another manner of connection, so loosening or tightening due to the action of a force during rotation of the support rod can be avoided.

The structure of the second connecting part 203 is similar to the structure of the first connecting part 201, so the description is not repeated here.

In the present application, the length of the main body part 202 is substantially equal to the distance between the stencil supports 112 and 113. The cleaning paper roll is wound on the main body part 202; the junction between the main body part 202 and the first connecting part 201 or second connecting part 203 will not be covered, or will only be covered to a small extent, by the cleaning paper roll. That is to say, the length of the main body part 202 is not less than, or slightly less than, the width of the cleaning paper in the axial direction of the support rod. Thus, the main body part 202 can be easily removed and mounted, avoiding interference from the cleaning paper roll during removal and mounting.

Elastic components are provided at the two ends of the support rod in the present application; these elastic components can move a small distance in the axial direction, but this is not enough to withdraw the support rod directly from the device. When it is necessary to disassemble the support rod, the fasteners 421 in the first connecting part 201 and second connecting part 203 are rotated so that they leave the main body part 202, then the main body part 202 is moved a very small distance in the axial direction so that the recesses thereof leave the protrusions of the corresponding connecting part, and then moved in the opposite direction. In this way, the main body part 202 can be disassembled. The cleaning paper roll wound on the main body part 202 can then be replaced.

The support rod in the present application can be easily removed and mounted without moving the stencil supports, and can adapt to high processing precision requirements.

Figure 5:
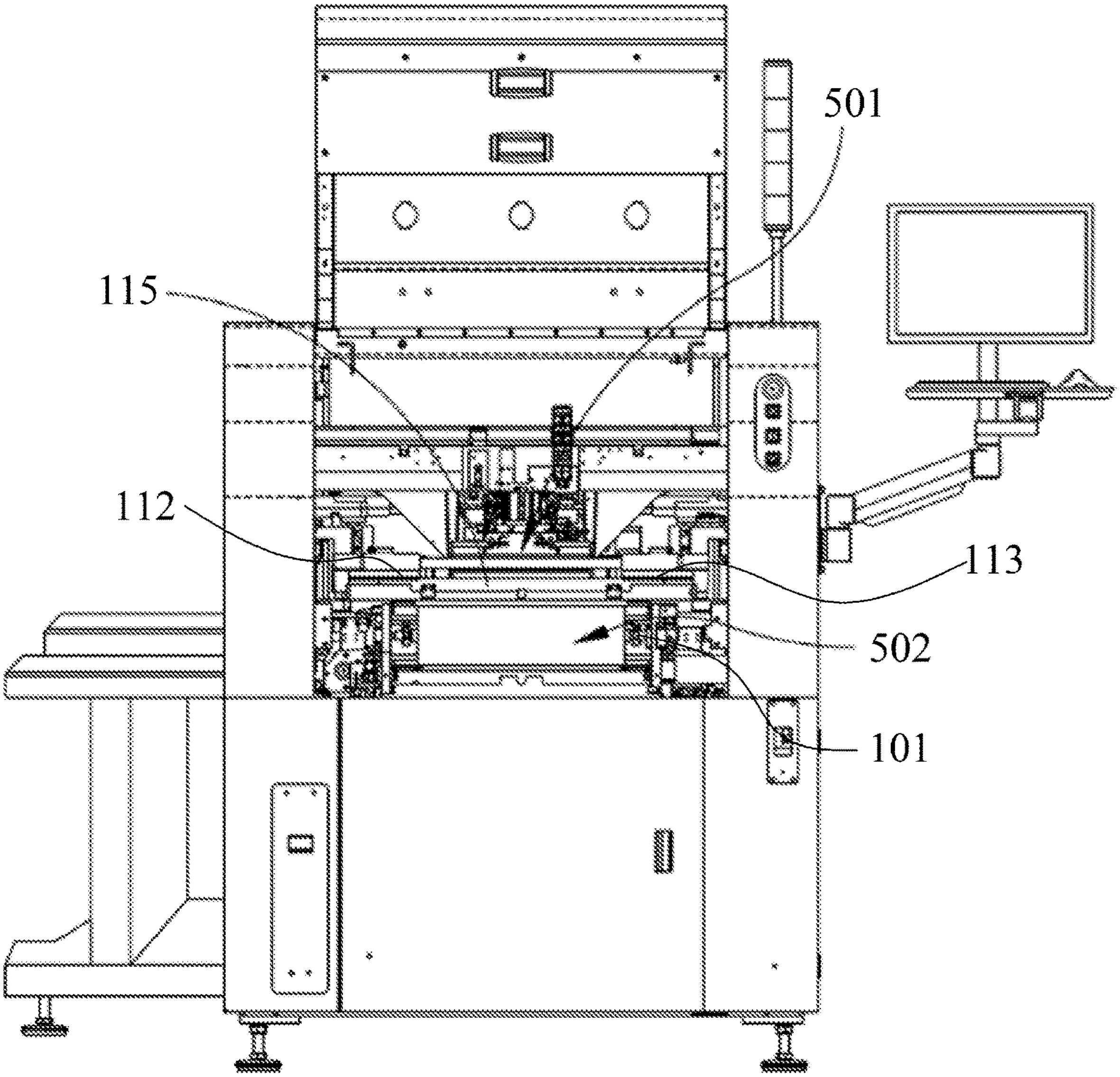
FIG. 5 is a schematic drawing of a solder paste printer in the present application.

FIG. 5 is a schematic drawing of a solder paste printer in the present application. Referring to FIGS. 1A and 5, the solder paste printer comprises a pair of stencil supports 112 and 113 disposed opposite each other, with a stencil mounting space 115 formed between the stencil supports 112 and 113. The stencil mounting space 115 is use to mount a stencil. A solder addition apparatus 501 is located above the stencil mounting space 115. A cleaning paper roll apparatus 502 is located below the stencil mounting space 115. The cleaning paper roll apparatus comprises a pair of support rods 101 and 102, and a cleaning paper roll wound on the support rods 101 and 102. The axial direction of the support rods 101 and 102 is substantially perpendicular to the direction of extension of the stencil supports 112 and 113. The main body part 202 of each of the support rods 101 and 102 is located directly below the stencil mounting space. At least part of the first connecting part 201 and at least part of the second connecting part 203 are located directly below the stencil supports 112 and 113; an inside end of the first connecting part 201 extends beyond an inside edge of the stencil support 112, or is flush with the inside edge of the stencil support 112; and an inside end of the second connecting part 203 extends beyond an inside edge of the stencil support 113, or is flush with the inside edge of the stencil support 113. When the main body part 202 is separated from the first connecting part 201 and the second connecting part 202, an operator can withdraw the main body part 202 from above the stencil mounting space 115.

Although the present disclosure has been described in conjunction with the examples of embodiments outlined above, various alternatives, modifications, changes, improvements and/or substantial equivalents, whether already known or foreseeable now or presently, may be obvious to those skilled in the art. In addition, the technical effects and/or technical problems described in this specification are exemplary rather than limiting; therefore, the disclosures in this specification may be used to solve other technical problems and have other technical effects. Thus, the examples of embodiments of the present disclosure as set forth above are intended to be illustrative and not restrictive. Various changes may be made without departing from the spirit or scope of the present disclosure. Accordingly, the present disclosure is intended to include all known or earlier developed alternatives, modifications, changes, improvements and/or substantial equivalents.

The invention claimed is:

1. A support rod, comprising:

a first connecting part, the first connecting part being connected to a device;

a second connecting part, the second connecting part being connected to the device;

a main body part, the main body part being located between the first connecting part and the second connecting part in an axial direction of the support rod, and removably connected to the first connecting part and the second connecting part, so that the main body part can be connected to or separated from the device, wherein the support rod can be driven to rotate, the main body part including a first end and a second end provided with a first engagement part and a second engagement part, respectively, wherein one end of the first connecting part is provided with a first mating part, and one end of the second connecting part is provided with a second mating part, the first engagement part can mate with the first mating part, and the second engagement part can mate with the second mating part, to limit rotation of the main body part relative to the first connecting part or the second connecting part, and wherein the first engagement part is at least one recess formed in such a way as to be sunk inward from an end face of the first end of the main body part, the second engagement part is at least one recess formed in such a way as to be sunk inward from an end face of the second end of the main body part, the first mating part is at least one protrusion formed in such a way as to protrude outward from an end face of one end of the first connecting part, the second mating part is at least one protrusion formed in such a way as to protrude outward from an end face of one end of the second connecting part, and at least one protrusion of each of the first mating part and the second mating part can enter at least one corresponding recess of the first engagement part and the second engagement part of the main body part, thereby limiting rotation of the main body part relative to the first connecting part or the second connecting part.

2. The support rod as claimed in claim 1, wherein:

the first engagement part and the second engagement part each comprise multiple recesses, the multiple recesses being distributed uniformly in the circumferential direction; and the first mating part and the second mating part each comprise multiple protrusions, the multiple protrusions being distributed uniformly in the circumferential direction;

each of the multiple recesses extends through a sidewall of the main body part in a radial direction of the support rod.

3. The support rod as claimed in claim 1, wherein:

the support rod comprises a pair of fasteners, the first connecting part and the second connecting part being connected to the main body part by means of a corresponding one of the pair of fasteners, respectively, and each of the pair of fasteners being able to move in the axial direction and thereby connect the main body part to the first connecting part or the second connecting part;

each of the first connecting part and the second connecting part comprises a guide segment, the corresponding one of the pair of fasteners being able to pass through the guide segment and enter the main body part, thereby being connected to the main body part.

4. The support rod as claimed in claim 3, wherein:

each of the first connecting part and the second connecting part comprises a hollow segment, the hollow segment being connected to a side of the guide segment that is remote from the main body part;

the hollow segment comprises an accommodating cavity, the accommodating cavity extending through the hollow segment in a radial direction of the support rod to form at least one window on a sidewall of the hollow segment, and at least part of the corresponding one of the pair of fasteners being located in the accommodating cavity.

5. The support rod as claimed in claim 1, wherein:

the support rod is used to support a cleaning paper roll of an electronic printer; the length of the main body part is not less than the width of the cleaning paper roll.

6. A printer, comprising:

a first stencil support and a second stencil support, the first stencil support and second stencil support extending in a first direction and being arranged side by side, and a stencil mounting space for mounting a stencil being formed between the first stencil support and second stencil support;

a pair of support rods, each of the pair of support rods extending in a second direction, the pair of support rods being located below the first stencil support and second stencil support, and each of the pair of support rods comprising:

a first connecting part, the first connecting part being connected to the printer;

a second connecting part, the second connecting part being connected to the printer;

a main body part, the main body part being located between the first connecting part and the second connecting part in an axial direction of the support rod, and removably connected to the first connecting part and the second connecting part, so that the main body part can be connected to or separated from the printer, the main body part including a first end and a second end provided with a first engagement part and a second engagement part, respectively;

wherein the main body part is able to pass through the stencil mounting space and thereby be withdrawn from above the first stencil support and second stencil support, and the pair of support rods can be driven to rotate, wherein one end of the first connecting part is provided with a first mating part, and one end of the second connecting part is provided with a second mating part, the first engagement part can mate with the first mating part, and the second engagement part can mate with the second mating part, to limit rotation of the main body part relative to the first connecting part or the second connecting part, and wherein the first engagement part is at least one recess formed in such a way as to be sunk inward from an end face of the first end of the main body part, the second engagement part is at least one recess formed in such a way as to be sunk inward from an end face of the second end of the main body part, the first mating part is at least one protrusion formed in such a way as to protrude outward from an end face of one end of the first connecting part, the second mating part is at least one protrusion formed in such a way as to protrude outward from an end face of one end of the second connecting part, and at least one protrusion of each of the first mating part and the second mating part can enter at least one corresponding recess of the first engagement part and the second engagement part of the main body part, thereby limiting rotation of the main body part relative to the first connecting part or the second connecting part.

7. The printer as claimed in claim 6, wherein:

the main body part is located directly below the stencil mounting space, the first connecting part is at least partly located directly below the first stencil support, and the second connecting part is at least partly located directly below the second stencil support;

wherein the first direction is substantially perpendicular to the second direction.

8. The printer as claimed in claim 6, wherein:

the first engagement part and the second engagement part each comprise multiple recesses, the multiple recesses being distributed uniformly in the circumferential direction; and the first mating part and the second mating part each comprise multiple protrusions, the multiple protrusions being distributed uniformly in the circumferential direction;

each of the multiple recesses extends through a sidewall of the main body part in a radial direction of the corresponding support rod.

9. The printer as claimed in claim 6, wherein:

each of the support rods comprises a pair of fasteners, the first connecting part and the second connecting part being connected to the main body part by means of a corresponding one of the pair of fasteners respectively, and each of the pair of fasteners being able to move in the axial direction and thereby connect the main body part to the first connecting part or the second connecting part;

each of the first connecting part and the second connecting part comprises a guide segment, the corresponding one of the pair of fasteners being able to pass through the guide segment and enter the main body part, thereby being connected to the main body part.

10. The printer as claimed in claim 9, wherein:

each of the first connecting part and the second connecting part comprises a hollow segment, the hollow segment being connected to a side of the guide segment that is remote from the main body part;

the hollow segment comprises an accommodating cavity, the accommodating cavity extending through the hollow segment in a radial direction of each of the support rods to form at least one window on a sidewall of the hollow segment, and at least part of the corresponding one of the pair of fasteners being located in the accommodating cavity.

11. The printer as claimed in claim 6, wherein:

the length of the main body part is not less than the width of the cleaning paper roll.

* * * * *